(No Model.)
J. S. HUYLER.
CONFECTIONER'S KETTLE.
No. 342,016. Patented May 18, 1886.
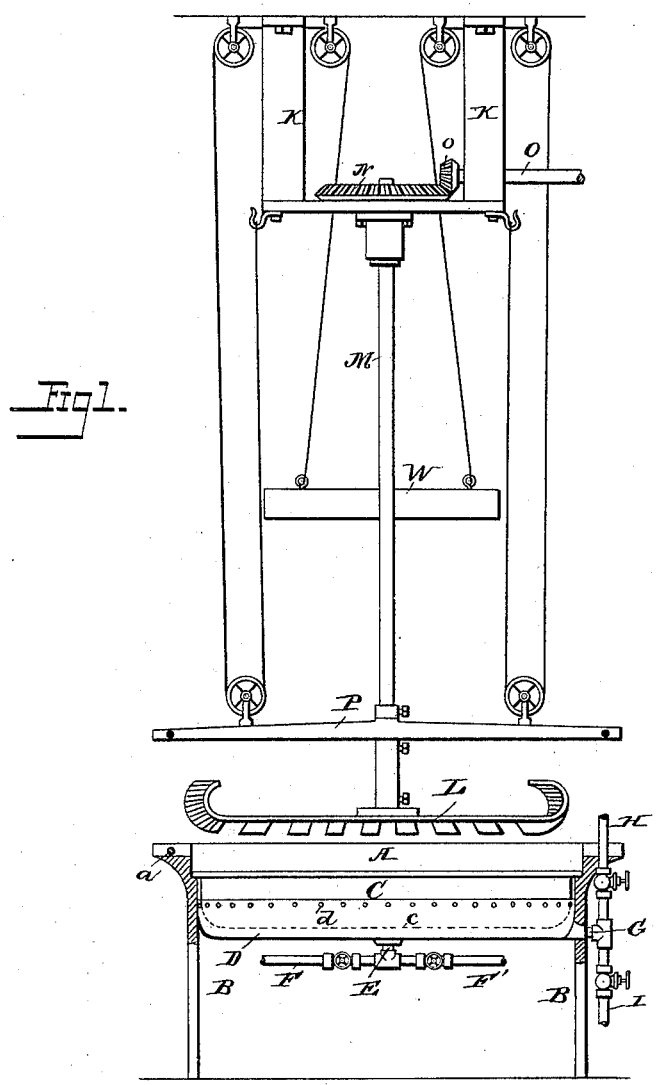
Fig 1.
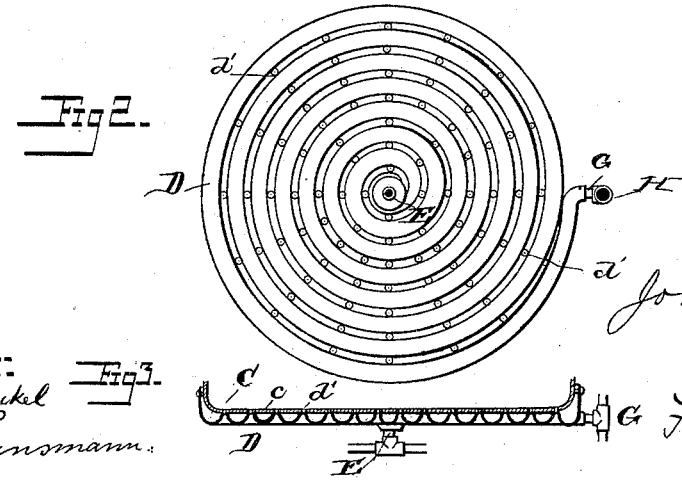
Fig 2.
Fig 3.
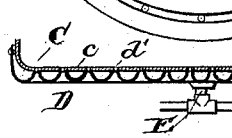
Attest:
John G. Hickel
K. C. Hansmann
Inventor:
John S. Huyler
by Foster & Freeman
att'ys

UNITED STATES PATENT OFFICE.

JOHN S. HUYLER, OF NEW YORK, N. Y., ASSIGNOR TO HUYLER'S, OF SAME PLACE.

CONFECTIONER'S KETTLE.

SPECIFICATION forming part of Letters Patent No. 342,016, dated May 18, 1886.

Application filed August 20, 1885. Serial No. 174,921. (No model.)

*To all whom it may concern:*

Be it known that I, JOHN S. HUYLER, a citizen of the United States, and a resident of the city, county, and State of New York, have invented certain new and useful Improvements in Confectioners' Kettles, of which the following is a specification.

In the preparation of that form of candy known as "French cream or fondant," it is necessary to melt and cook the sugar and then cool the same as quickly as possible, and to form the cooling mass into such condition that the same attains that snowy character which gives it the appearance of fresh cream. This process, so far as I am aware, has heretofore been practiced exclusively by hand and with the use of expensive and inefficient devices; and it is the object of my invention to provide an apparatus by means of which fondant may be manufactured with great certainty as to the quality of the product in large quantities and with great rapidity, and consequently cheaper than in the ordinary purely manual process.

To this end my invention consists, mainly, in a shallow extensive melting-pan having a flat bottom provided with a combined heating and cooling worm, and a stirring or creaming apparatus arranged to be adjusted into or out of the pan, as hereinafter more fully set forth.

Referring to the accompanying drawings, forming part of this specification, Figure 1 is a side view of one form of my improved apparatus. Fig. 2 is an inverted plan of the kettle, and Fig. 3 is a cross-section of the same.

Supported in a suitable frame, A, having legs B, is a shallow pan or vessel, C, made of suitable material—as copper—having an extensive surface and a flat bottom, C.

Secured to the under side of the bottom of the pan is the combined heating and cooling worm D, having the general shape of a spirally-corrugated disk with upturned edges, which latter are riveted to the sides of the pan, as shown at *d*. The ridges of the spirally-corrugated disk are also securely riveted to the flat bottom *c* of the pan C by a series of bolts, *d'*, properly headed or countersunk, so as to leave the bottom of the pan quite smooth. A continuous spiral passage is thus provided extending around the rim and converging toward the center of the bottom of the pan. Connected with the central terminus of this passage is a pipe, E, having two branches, F F', provided with proper stop-cocks, and serving, respectively, as a steam-outlet and a water-inlet. To the peripheral termini of the spiral coil is likewise connected a pipe, G, having two branches, H and I, having proper stop-cocks, and serving, respectively, as a steam-inlet and a water-outlet.

The pan or vessel is shown as seated upon a flange or ledge in the frame; but this is not essential, as it may be otherwise supported.

Above the pan and in proper relation thereto is arranged a stirring apparatus, which in the drawings is shown as secured to hangers K. It consists of a dasher, L, secured to the end of a vertical shaft, M, properly feathered or splined, and passing loosely through the hub of a bevel wheel or gear, N, journaled in the hanger, and receiving motion from a shaft, O, having a bevel-pinion, *o*.

Sleeved upon the shaft M is a bar or cross-head, P, which, when the dasher is lowered into the pan, as hereinafter described, is secured to the frame A by any suitable means, as by hand-screws *a*, passing through the frame and the ends of the cross-head.

The relations between the dasher and cross-head are such that when the latter is seated in the frame the former will just clear the bottom of the pan.

A counter-weight, W, for supporting the shaft and its appendages may be provided.

The dasher or stirrer L is shown as consisting of two arms extending from the shaft M, and having suitably-shaped wings or blades to lift, stir, and cream the contents of the pan. Any other form of dasher may be used, depending upon the effects to be produced.

By the described construction of the pan and worm I am enabled to produce a very substantial and rigid vessel, and one well adapted to withstand the effects of contraction and expansion to which it is subjected when in use.

By the peculiar construction of the worm and its connections I am enabled to supply a uniform heat to all parts of the bottom of the vessel, and then to cool the same also uniformly and quickly, which is a great desideratum in the process of manufacturing French cream.

The apparatus is used as follows: The pan is charged with a suitable amount of sugar, and the steam is admitted through the pipe H, and passes by the pipe G to the outer terminus of the spiral coil, and through the coil to the central outlet, E, and pipe F, the stop-cocks of F' and I being closed. The live steam coming thus first in contact with the outer parts of the bottom of the vessel, which are necessarily the colder parts, and only successively with the central portions of the same, will heat the pan very uniformly, effecting a thorough and even melting and cooking of the sugar, and causing a uniform expansion of all parts of the vessel. When the sugar is properly melted and cooked, the steam inlet and outlet pipes are closed and the water inlet and outlet pipes are opened. The cooling-water enters by the central terminal of the coil and passes through the same to the outer terminal. Thus the central or hottest part of the pan receives the cooling agent when most effective, while the outer or cooler portions of the pan receive the cooling agent successively. Thus the body of the cooling agent first comes in contact with the center of the pan where the latter can best withstand the violent contraction which results, and which extends itself gradually and uniformly throughout the vessel. At the proper stage of the process the dasher is lowered into the pan and the cross-head being properly secured motion is imparted to the dasher, and the mass of material is properly stirred and creamed while in the pan until it arrives to the desired condition. After the cream has been removed the vessel may be easily and rapidly cleaned preparatory to the manipulation of another batch by revolving the dasher in a charge of water, which may be readily heated by the admission of steam through the spiral coil. By this construction I am enabled to melt, cook, cool, and cream a large batch of material in a very rapid manner without depending upon the skill, labor, and manual dexterity of the operator.

It is evident that while the form and construction of apparatus above shown and described is well adapted to the use intended it may be varied to a great extent without departing from the spirit of my invention, and that parts of my improvement may be used without the other parts shown, or with equivalent forms.

What I claim is—

1. A pan having a flat bottom and a spirally-corrugated plate or false bottom riveted thereto, forming a combined heating and cooling worm, substantially as described.

2. A pan having a broad flat bottom and a spirally-corrugated plate or false bottom secured thereto, forming a worm, and combined inlet and outlet pipes connected with the terminals of the worm, substantially as described.

3. A combined heating and cooling pan consisting of an extended shallow vessel having a flat bottom and a spirally-corrugated false bottom with upturned edges, the two being riveted together at the upturned edges and at the ridges of the corrugations, substantially as described.

4. In combination with a heating and cooling vessel having a spiral worm at its bottom, of a combined steam-inlet and water-outlet connected to its outer terminus, and a combined steam-outlet and water-inlet connected to its inner terminus, as and for the purpose described.

5. The combination, with a combined heating and cooling pan, substantially as described, of a rotary dasher arranged centrally above the pan, and means for raising and lowering the same, substantially as set forth.

6. The combination, with a combined heating and cooling pan, substantially as described, of a rotary dasher secured upon an adjustable and counterweighted shaft, a cross-head sleeved upon the shaft, and means for securing the cross-head and dasher in proper relations to the pan, substantially as and for the purpose set forth.

In testimony whereof I have signed my name to this specification in the presence of two subscribing witnesses.

JNO. S. HUYLER.

Witnesses:
 B. F. DeKLYN,
 J. SCHÜLLINGER.